United States Patent [19]

Cooper et al.

[11] 4,326,253
[45] Apr. 20, 1982

[54] LIFT CONTROL SYSTEM FOR AIRCRAFT VERTICAL PATH GUIDANCE

[75] Inventors: Michael G. Cooper, Renton; Alessandro P. Sassi, Bellevue, both of Wash.

[73] Assignee: The Boeing Company, Seattle, Wash.

[21] Appl. No.: 136,121

[22] Filed: Mar. 31, 1980

[51] Int. Cl.³ .............................................. G06G 7/78
[52] U.S. Cl. .................................. 364/435; 364/428; 244/181; 73/178 T
[58] Field of Search ............... 364/433, 435, 428; 244/180, 181, 182; 318/489, 584; 340/27 NA, 27 R; 73/178 T, 179

[56] References Cited

U.S. PATENT DOCUMENTS

| | | | |
|---|---|---|---|
| 3,241,792 | 3/1966 | Hattendorf | 244/181 |
| 3,594,553 | 7/1971 | McElroy | 364/435 |
| 3,618,878 | 11/1971 | Klein et al. | 244/181 |
| 3,627,237 | 12/1971 | Smith | 244/181 |
| 3,654,443 | 4/1972 | Dendy et al. | 364/435 |
| 3,805,033 | 4/1974 | Manke et al. | 364/428 |
| 3,930,610 | 1/1976 | Hache | 364/435 |
| 4,027,839 | 6/1977 | Quinlivan | 364/435 |
| 4,044,975 | 8/1977 | Blechen et al. | 364/435 |
| 4,093,158 | 6/1978 | Clews et al. | 244/181 |

Primary Examiner—Mark E. Nusbaum
Assistant Examiner—Gary Chin
Attorney, Agent, or Firm—James P. Hamley; Bernard A. Donahue

[57] ABSTRACT

A system for providing an optimum lift demand signal for aircraft maneuvers such as "go-around" includes a computer for generating a reference angle of attack signal which is functionally related to the aircraft's vertical velocity. The reference signal is compared with a signal corresponding to the aircraft's actual angle of attack, thereby producing an error signal. The error signal is utilized as a control to the aircraft's dynamics for optimizing the aircraft's climb-out performance.

4 Claims, 6 Drawing Figures

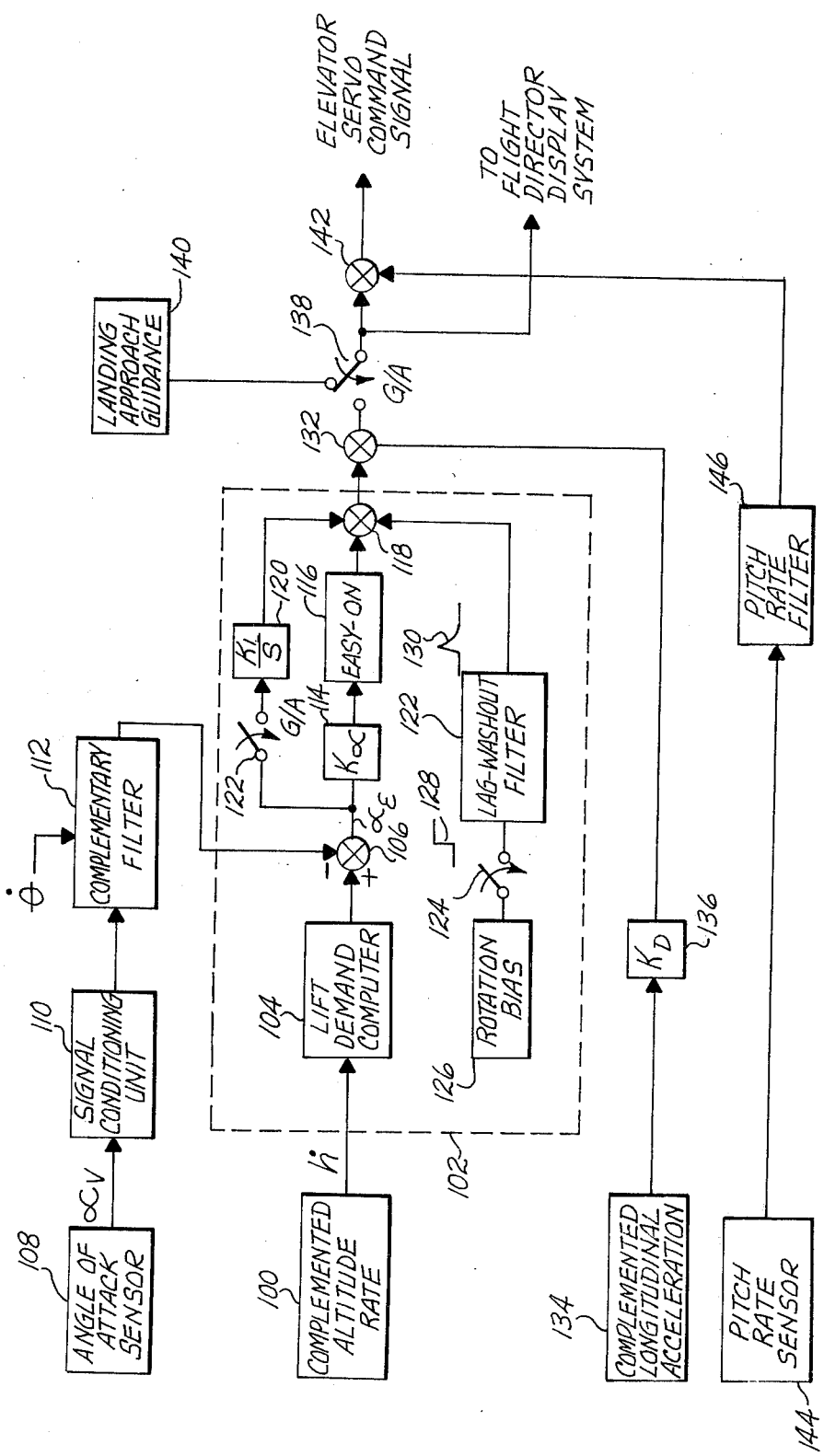

LIFT CONTROL SYSTEM FOR AIRCRAFT VERTICAL PATH GUIDANCE

BACKGROUND OF THE INVENTION

This invention pertains to the aircraft control art and, more particularly, to an aircraft optimum lift control system.

Investigations have shown that several aircraft accidents have been caused by severe windshear conditions encountered during takeoff and landing operations. Analysis has shown that the aircraft has sufficient performance capability to avoid most, if not all, of these adverse windshear conditions. The problem has been, basically, one of the flight crew not utilizing the aircraft's performance capabilities in such a manner that the problem can be avoided.

In an attempt to aid the flight crew in utilizing the aircraft's capabilities during climb-out operations, particularly in adverse environmental conditions such as windshear, the prior art has developed numerous climb-out guidance systems. One such system is shown in FIG. 1. Here, an altitude rate sensor 10 produces an output signal $\dot{h}$ which is representative of aircraft altitude rate. The $\dot{h}$ signal is compared with an altitude rate bias signal $\dot{h}_B$ in a summer 12. The altitude rate bias signal $\dot{h}_B$ is supplied by circuitry indicated by block 14. Block 14 is programed to produce an altitude rate bias signal $\dot{h}_B$ which establishes a desired rate of aircraft climb. Thus the output from summer 12 is an error signal $\dot{h}_\epsilon$ equal to the difference between the aircraft's actual altitude rate and the desired rate. The signal $\dot{h}_\epsilon$ is passed through a shaping filter 16 which, as is well known in this art, enhances system stability. The signal is then summed with a minor loop damping signal, provided by circuitry 18, in a summer 20. As is well known in the aircraft art, minor loop damping signals are generally stabilizing pitch rate signals which prevent short period aircraft oscillation. The resultant output is an elevator command signal $\sigma_{EC}$ which, when applied to the aircraft's dynamics, controls the aircraft to the commanded climb rate.

FIG. 2 illustrates a second prior art approach which uses a signal proportional to flap position to control the attitude of the aircraft in such a way that its angle of attack follows a pre-programed function. Here, an aircraft angle of attack sensor 30 produces an output signal $\alpha_v$ corresponding to the aircraft's actual angle of attack. This signal is filtered in a filter 32 which performs a similar function to that described with respect to filter 16 of FIG. 1 thereby producing an output signal $\alpha_c$. This signal is fed as one input to a summer 34.

The sensor 36 produces an output signal $\delta_F$ corresponding to the displacement of the aircraft's flaps. The $\delta_F$ signal is passed to a computer 38 which is programed to output a predetermined angle of attack demand signal $\alpha_d$ as a function of flap position. The summer 34 produces an output error signal $\alpha_\epsilon$ equal to the difference between the aircraft's actual angle of attack $\alpha_c$ and the demanded angle of attack $\alpha_d$. This signal is summed with path damping signals provided by block 40 in a summer 42. The path damping signals, which are well known in the art, stabilize the aircraft against phugoid perturbations. The output of summer 42 is filtered in filter 44 which provides the same function as filter 16 of FIG. 1, in addition to limiting the maximum value of the signal, and is applied as one input to a summer 46. The other inputs to summer 46 are an output from a minor loop damping block 48, which operates in a manner identical to 18 of FIG. 1, and the output from a pitch attitude block 50. Pitch attitude block 50 produces an output signal which is proportional to the aircraft's pitch attitude. The resultant output from summer 46 is an elevator command signal $\delta_{EC}$ which is then coupled to the aircraft's dynamics, through the elevator servo control system.

While the second prior art approach does offer the flight crew assistance in climbing out of windshear conditions, both prior systems exhibit numerous shortcomings. For example, the control laws produced by either of the prior art systems are inherently inflexible with respect to variations in aircraft weight and available thrust. In addition, the systems do not totally take into account environmental disturbances, such as windshear and downdraft. In addition, the prior art system of FIG. 2 is critically dependent on pilot action since the basic control parameter (i.e., angle of attack) is a unique function of the position of the flaps. Also, this system is susceptible to errors resulting from the failure of flap position sensors.

Thus, none of the prior art systems takes into account all of the various factors which must be considered in producing an optimum lift control system.

SUMMARY OF THE INVENTION

It is an object of this invention, therefore, to provide an improved aircraft climb-out guidance system.

It is a further object of this invention to provide the above described aircraft climb-out guidance system which takes into account aircraft weight, thrust and environmental conditions to produce an optimum lift control signal.

It is an additional object of the invention to provide the above described aircraft climb-out guidance system which can be used for both take-off and go-around maneuvers.

It is a further object of the invention to provide the above described aircraft climb-out guidance system which is useable with both flight director and autopilot systems.

Briefly, according to the invention, an aircraft vertical path guidance control system includes a means which produces a signal $\dot{h}$ corresponding to the aircraft's vertical velocity. A lift computer produces a reference lift demand angle of attack signal $\alpha_{ref}$, which $\alpha_{ref}$ signal is a continuously variable function of $\dot{h}$ between predetermined maximum and minimum angle of attack values, $\alpha_{max}$ and $\alpha_{min}$, respectively. This function is independent of other aircraft parameters. A signal $\alpha$, corresponding to the aircraft's actual angle of attack is produced. An error signal $\alpha_\epsilon$ produced which corresponds to the difference between the reference lift demand angle of attack signal $\alpha_{ref}$ and the actual angle of attack signal $\alpha$. The $\alpha_\epsilon$ signal is utilized as a control signal to the aircraft's dynamics for controlling the vertical lift characteristic of the aircraft.

A method for producing an aircraft lift control vertical path guidance signal includes the steps of first providing a signal $h$ corresponding to the aircraft's actual vertical velocity. Second, a reference lift demand angle of attack signal $\alpha_{ref}$ is generated, which signal is a continuously variable function of $h$ between predetermined maximum and minimum angle of attack values, $\alpha_{max}$ and $\alpha_{min}$, respectively. This function is independent of other aircraft parameters. Third, a signal $\alpha$ is provided which corresponds to the aircraft's actual angle of attack. Fourth, an error signal $\alpha_\epsilon$, corresponding to the difference between the reference lift demand angle of attack $\alpha_{ref}$ and the actual angle of attack signal $\alpha$, is produced. Finally, the error signal $\alpha_\epsilon$ is utilized as a control to the aircraft's dynamics for controlling the vertical lift characteristic of the aircraft.

DETAILED DESCRIPTION OF THE DRAWINGS

Figure 3:
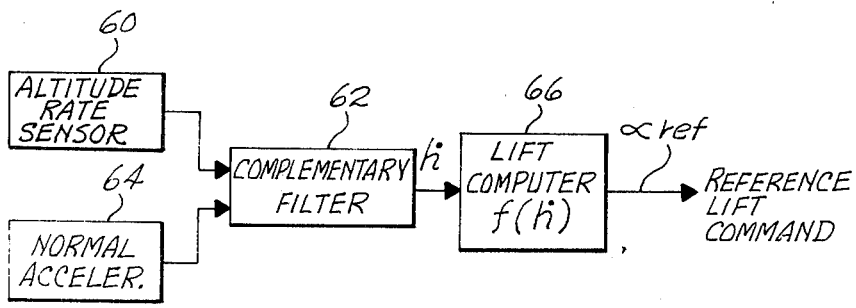
FIG. 3 is a block diagram illustrating the preferred apparatus for generating a reference lift demand control signal.
Figure 4:
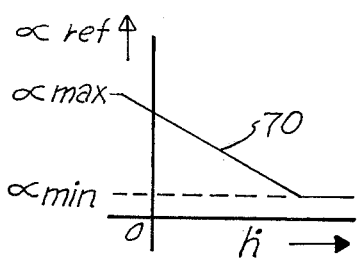
Figure 6:
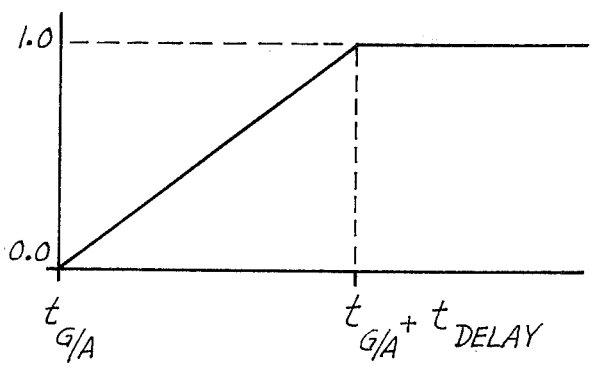

FIG. 4 graphically illustrates the response of the lift computer shown in FIG. 3;

FIG. 5 is a detailed block diagram illustrating the preferred arrangement of the aircraft climb-out vertical path guidance system adapted for both flight director and autopilot control; and FIG. 6 illustrates the transfer characteristic of the easy-on block shown in FIG. 5.

DETAILED DESCRIPTION OF THE PREFERRED EMBODIMENT OF THE INVENTION

Figure 1:
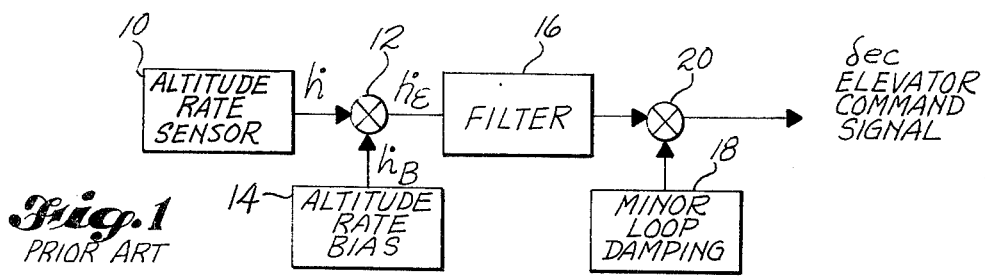
FIGS. 1 and 2 are block diagrams illustrating prior art aircraft vertical path guidance systems.
Figure 2:
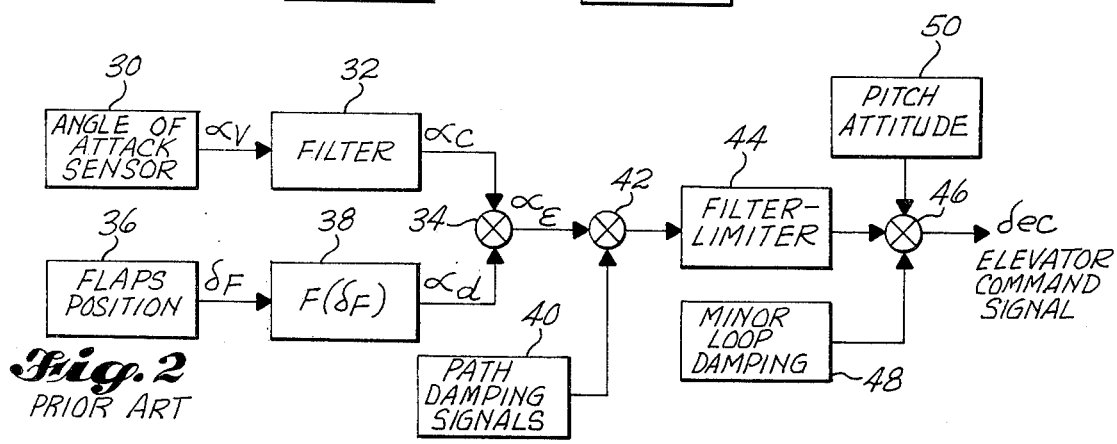

FIGS. 1 and 2 illustrate prior art vertical path guidance systems and are fully discussed above.

FIG. 3 is a block diagram illustrating the preferred apparatus for generating an aircraft lift demand control signal. Here, block 60 produces an output signal corresponding to the aircraft's altitude rate. This block might include, for example, the approriate output of a central air data computer. This signal is complementary filtered in filter 62 with a normal acceleration signal provided by block 64. The normal acceleration signal is commonly provided in commercial aircraft and is a sensor signal which is proportional to the acceleration of the aircraft normal to its longitudinal axis.

The altitude rate signal from block 60 is reliable as a low frequency reference, whereas the normal acceleration signal from block 64 is particularly accurate at high frequencies. Thus, to take advantage of the low frequency accuracy of block 60 and high frequency accuracy of block 64 the complementary filter 62 is employed. Complementary filter 62 is of standard design, passing to its output the low frequency output of block 60 and the high frequency output of block 64. This complementary filtered signal then is an output altitude rate signal $\dot{h}$.

The altitude rate signal $\dot{h}$ is passed to the input of the lift computer 66.

FIG. 4 illustrates the functional relationship established by lift computer 66. Shown is an output reference lift demand signal $\alpha_{ref}$ plotted versus altitude rate $\dot{h}$. The active portion of this curve, indicated by reference numeral 70 is seen to be a continuously variable function of $\dot{h}$ between predetermined maximum and minimum values of angle of attack, $\alpha_{max}$ and $\alpha_{min}$, respectively. By design, the function is independent of other aircraft parameters, such as an engine out condition.

The slope of active portion 70 of the transfer curve is determined by the individual aircraft for which the system is designed.

This continuously variable relationship assures that the lift capability of the aircraft is optimized for safety and passenger comfort, regardless of weight, thrust variations and unfavorable environmental conditions.

In the prior art is has been thought that the aircraft should be flown at its maximum lift to drag ratio, particularly under an engine out condition. During the course of developing the present invention, however, it was discovered that, in certain circumstances, it is desirable to fly the airplane at its maximum lift capability.

Also, unlike previous systems, the performance of the instant system based on the continuously variable $\dot{h}$ relationship is independent of flap position in that the system will automatically seek an angle of attack which is not uniquely related to flap position.

Thus, the unique continuously variable $\dot{h}$ relationship assures that the full capability of the aircraft will be used to optimize lift.

The active portion 70 of the transfer function shown in FIG. 4 has break points at $\alpha_{max}$ and $\alpha_{min}$. Generally, the $\alpha_{max}$ break point is selected at that aircraft angle of attack within a predetermined margin approaching aircraft stall.

The $\alpha_{min}$ break point is chosen as to that aircraft angle of attack which corresponds to the desired maximum aircraft forward velocity.

It should be understood, however, that the limiting points for the $\alpha_{ref}$ signal may be chosen on the basis of other criteria without departing from the true scope and spirit of the invention.

FIG. 5 is a detailed block diagram illustrating the preferred arrangement of the aircraft climb-out guidance system.

Here, a complemented altitude rate signal $\dot{h}$ is produced out of block 100. As is discussed with respect to FIG. 3, block 100 includes a complementary filter which combines the altitude rate signal with the normal acceleration signal provided by sensors normally found on commercial aircraft.

The altitude rate signal $\dot{h}$ is passed as one input to the optimum lift computer 102. Here, the signal $\dot{h}$ is processed through a lift demand computer 104. Lift demand computer 104 has the same transfer function as lift computer 66 of FIG. 3, which transfer function is shown in FIG. 4. Thus, the output from lift demand computer 104 is an angle of attack reference signal $\alpha_{ref}$. This signal is passed to the positive input of a summer 106. Applied to the negative input of summer 106 is a signal, $\alpha_c$, which corresponds to the complemented aircraft actual angle of attack. Commercial aircraft are commonly provided with an angle of attack sensor, here shown as block 108. This sensor produces a signal $\alpha_v$ corresponding to the angle of attack as sensed by a vane. The vane angle of attack signal $\alpha_v$ is subject to errors produced by its location on the aircraft body and nonlinear airflow across the sensor. Thus, a signal conditioning unit 110 processes the angle of attack vane signal $\alpha_v$ to produce a signal $\alpha_B$ corresponding to the actual aircraft body angle of attack. The design and construction of a circuit such as the signal conditioning unit 110 is well known to those skilled in this art and, as such, will not be discussed here.

The body angle of attack signal $\alpha_B$ is complementary filtered in filter 112. A second input to filter 112 is an aircraft pitch rate signal $\dot{\theta}$. This signal is supplied by normal means found on commercial aircraft. The accuracy of the $\alpha_B$ signal is greater than that of the $\dot{\theta}$ signal at low frequencies, whereas it is less at high frequencies. Thus, the complementary filter 112 is designed such that for low frequencies it passes the $\alpha_B$ to its output with the $\dot{\theta}$ signals being passed at high frequencies. This results in an angle of attack complemented signal $\alpha_c$ which is passed to the negative input of summer 106.

The output of summer 106 is, thus, the difference between the $\alpha_{ref}$ signal from lift demand computer 104 and the $\alpha_c$ signal from complementary filter 112. This difference constitutes an error signal $\alpha_\epsilon$.

The error signal $\alpha_\epsilon$ is amplified by a gain block 114. The gain, $K_\alpha$, of gain block 114 is chosen to maintain aircraft stability at a high performance level and, as such, such selection is well known to those skilled in this art.

The output from gain block 114 is passed to an easy-on block 116. The transfer characteristic of gain block 116 is better understood with reference to FIG. 6. Shown in FIG. 6 is the gain of easy-on block 116 as a function of time. Thus, at the time a pilot initiates go-around, that is $t_{G/A}$, the gain of block 116, and thus its output, is zero. Following go-around initiation the gain of easy-on block 116 linearly increases until it reaches and levels at a value of 1.0. The total time for this transition from a zero to a one gain level is designated $t_{DELAY}$. The purpose for the easy-on block 116 is to avoid a huge step change to the aircraft's dynamics at go-around initiation. That is, to maintain control of the aircraft, the aircraft's elevator should not suddenly be shifted to a drastically new position. Easy-on block 116 assures a smooth transition.

The output from easy-on block 116 is passed to one input of a summer 118. Another input to summer 118 is the output from an integrator 120. Integrator 120 connects through a go-around switch 122 to the angle of attack error signal $\alpha_\Delta$. Switch 122 is normally open, closing only upon the pilot's initiation of a go-around maneuver. With switch 122 closed, the integrator, having a predetermined gain characteristic $K_1$, the choice of which is well known in this art, produces an output signal equal to the integral of $\alpha_\epsilon$. Thus, integrator 120 acts in a feed forward manner to eliminate offsets in the output control signal relative to the desired level and, as such, tends to cause the $\alpha_\epsilon$ signal to be driven to zero, thus providing a high level of precision to system operation.

A final input to summer 118 is the output from a lag washout filter 122. The lag washout filter is coupled through a switch 124 to a rotation bias block 126. As can be appreciated from the above discussion, once the pilot initiates go-around neither the output from the easy-on block 116 nor the output from integrator 120 will cause a substantial change in the control to the aircraft's elevators. Thus, to provide an initial impetus to the elevators and thereby promote the go-around maneuver, the rotation bias block 126 and lag washout filter 122 are provided. The rotation bias block 126 may be, for example, a fixed DC source. Thus, when the go-around switch 124 is closed a step function, indicated at 128, appears at the input to the lag washout filter 122. Lag washout filter 122 is, essentially, a band pass filter which passes a waveform such as that shown as 130. This waveform is seen to have a sharp leading edge, trailing off to zero. This sharp leading edge signal, when passed through the summer 118 and out to the aircraft's dynamics assures the desired initial elevator impetus.

Thus, the output from the optimum lift computer 102 is an angle of attack control signal which is a continuously variable function of $\dot{h}$ between predetermined maximum and minimum angle of attack values. The function is independent of other aircraft parameters.

The output from optimum lift computer 102 is passed to a summer 132. Coupled to the remaining input of summer 132 is the output from a complemented longitudinal acceleration block 134 as passed through a gain block 136. As is well known in the design of aircraft, the aircraft body is susceptible to certain characteristic low frequency oscillations, commonly known as the phugoid mode. To dampen phugoid oscillations, a signal corresponding to complemented longitudinal acceleration, which signal is normally provided in commercial aircraft, may be summed with a control signal out of optimum lift computer 102 to thereby dampen phugoid oscillations. The choice of the gain factor $K_D$ is, as is well known in this art, selected to provide the proper amount of phugoid damping without causing system instabilities.

The output from summer 132 is passed to one pole of a switch 138. Switch 138 normally selects the output from a landing approach guidance block 140. As is well known in this art, modern commercial aircraft are provided with avionics which produce control signals corresponding to the position of the aircraft with respect to a predetermined glide slope. Thus, in a normal landing operation the landing approach guidance signals 140 will control the aircraft's dynamics. However, when the pilot initiates a go-around maneuver, switch 138 selects the output from summer 132 for application to the aircraft's dynamics. The signal selected by switch 138 is routed directly to the flight deck flight director display system thereby indicating to the pilot the desired command for landing approach guidance if the "land" mode is selected, or optimum lift guidance for "go-around" mode select.

The switch selected signal is also passed to a summer 142. As is well known in this art, aircraft are subject not only to a long period, low frequency phugoid oscillation but also to certain short period oscillations. These oscillations, in the present design, are dampened by passing the output of a pitch rate sensor 144 through a pitch rate filter 146 and summing this with a control signal applied to summer 142. The pitch rate sensor 144 is normally provided in modern commercial aircraft and simply creates an output signal corresponding to the aircraft's pitch rate. This signal is filtered in filter 146 to remove high frequency noise and applied to the summer 142 as a short period damping term.

Finally, the output from summer 142 is adapted to be applied to the aircraft's elevator servo, thereby controlling the aircraft's dynamics.

In summary, an aircraft vertical path guidance control system has been described which provides aircraft climb-out guidance taking into account aircraft weight, thrust and environmental conditions to produce an optimum lift control signal.

While a preferred embodiment of the invention has been described in detail, it should be understood that many modifications and variations thereof are possible, all of which fall within the true spirit and scope of the invention.

We claim:

1. An aircraft vertical path guidance system comprising:
   means for producing a signal $\dot{h}$ corresponding to the aircraft's vertical velocity;
   lift computer means for producing a reference lift demand angle of attack signal $\alpha_{ref}$, said $\alpha_{ref}$ signal being a continuously variable function of $\dot{h}$ between predetermined maximum and minimum angle of attack values, $\alpha_{max}$ and $\alpha_{min}$, respectively, said function of $\dot{h}$ being independent of other aircraft parameters;

means for producing a signal $\alpha$ corresponding to the aircraft's actual angle of attack;

error signal means for producing an error signal $\alpha_\epsilon$ corresponding to the difference between said reference lift demand angle of attack signal $\alpha_{ref}$ and said actual angle of attack signal $\alpha$; and utilization means for utilizing said $\alpha_\epsilon$ signal as a control to the aircraft's dynamics for controlling the vertical lift characteristic of the aircraft.

2. The aircraft vertical path guidance control system of claim 1 wherein said lift computer means further comprises:

means for limiting said $\alpha_{ref}$ signal to said maximum level $\alpha_{max}$ corresponding to a predetermined margin of angle of attack within stall of the aircraft; and means for limiting said $\alpha_{ref}$ signal to said minimum level $\alpha_{min}$ corresponding to the aircraft's maximum desired forward velocity.

3. A method for producing an aircraft lift control vertical path guidance signal comprising the steps of:

(a) providing a signal $\dot{h}$ corresponding to the aircraft's actual vertical velocity;

(b) generating a reference lift demand angle of attack signal $\alpha_{ref}$ which is a continuously variable function of $\dot{h}$ between predetermined maximum and minimum angle of attack values, $\alpha_{max}$ and $\alpha_{min}$, respectively, said function of $\dot{h}$ being independent of other aircraft parameters;

(c) providing a signal $\alpha$ corresponding to the aircraft's actual angle of attack;

(d) producing an error signal $\alpha_\epsilon$ corresponding to the difference between said reference lift demand angle of attack signal $\alpha_{ref}$ and said actual angle of attack signal $\alpha$; and (e) utilizing said error signal $\alpha_\epsilon$ as a control to the aircraft's dynamics for controlling the vertical lift characteristic of the aircraft.

4. The method of claim 3 wherein step (b) comprises the further steps of:

(i) limiting said $\alpha_{ref}$ signal to said maximum level $\alpha_{max}$ corresponding to a predetermined margin of angle of attack within stall of the aircraft; and (ii) limiting said $\alpha_{ref}$ signal to said minimum level $\alpha_{min}$ corresponding to the aircraft's desired forward velocity.

* * * * *